May 12, 1925.
A. J. CRUSE ET AL
1,537,292
AUTOMOBILE TURNING SIGNAL
Filed May 7, 1923
2 Sheets-Sheet 2
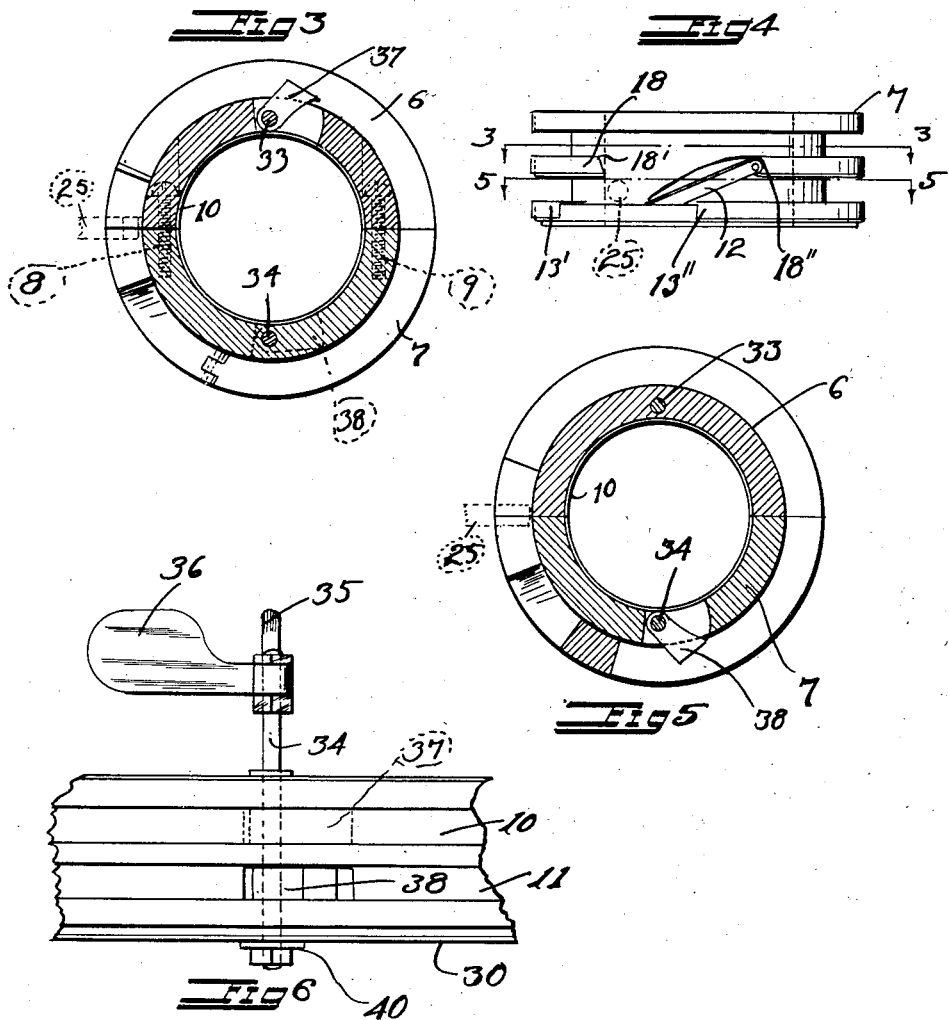
INVENTOR.
A J. Cruse
W L Hanscom
BY Bert Beckerleg
Carlos P. Griffin
ATTORNEY.

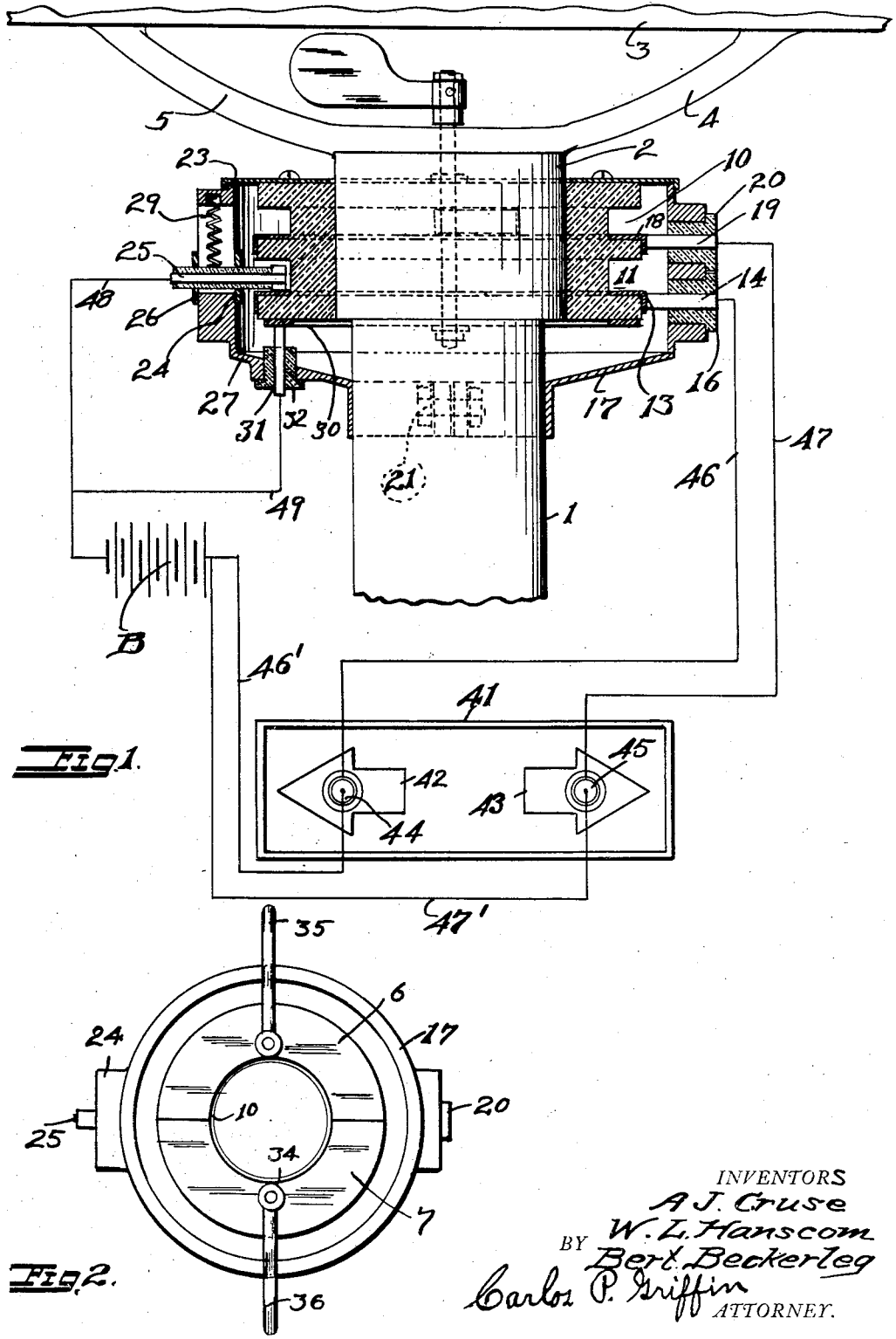

Patented May 12, 1925.

1,537,292

UNITED STATES PATENT OFFICE.

ANDREW J. CRUSE, WALTER L. HANSCOM, AND BERT BECKERLEG, OF SAN FRANCISCO, CALIFORNIA.

AUTOMOBILE TURNING SIGNAL.

Application filed May 7, 1923. Serial No. 637,111.

*To all whom it may concern:*

Be it known that we, ANDREW J. CRUSE, WALTER L. HANSCOM, and BERT BECKERLEG (whose full first name is BERT), citizens of the United States, residing at San Francisco, in the county of San Francisco, State of California, have invented a new and useful Automobile Turning Signal, of which the following is a specification in such full and clear terms as will enable those skilled in the art to construct and use the same.

This invention relates to a signal for an automobile, and its object is to produce a signal which will be capable of indicating in which direction the driver is about to turn before the turn has been made, and which will automatically reset the switch to the normal position, and continue the illumination of the lamp until the turn has been completed, after which it will restore the contact making device to its initial position.

It will be understood by those skilled in the art that, at the present time, the laws require some sort of a signal in advance of the actual turn being made to indicate to drivers approaching the car from the rear, whether that particular car is going to turn in one direction or the other.

If the driver turns a switch to illuminate a lamp, he will frequently leave the switch in the "on" position after the turn has been made, and the signal, therefore, loses its value, but with the present invention he may illuminate either one of two signal lamps, and when he makes the turn, the steering gear will automatically continue the illumination of either lamp until the turn has been completed, and will then reset whichever switch has been moved to the "on" position.

Other objects of the invention will appear as the description proceeds.

An embodiment of the invention is shown in the accompanying drawings in which the same reference numeral is applied to the same portion throughout, but we are aware that there may be modifications thereof.

Fig. 1 is a sectional view through the apparatus, showing its position with respect to the steering wheel, the wiring and signal lamps being shown diagrammatically, Fig. 2 is a plan view of the apparatus which is secured to the steering post, showing both switches, Fig. 3 is a sectional view on the line 3—3 of Fig. 4, Fig. 4 is a side elevation of the insulated ring which is secured to the hub of the steering post for effecting the automatic lighting, Fig. 5 is a horizontal sectional view of the ring shown in Fig. 4 on the line 5—5.

Fig. 6 is a view showing one of the switches in an "on" position, and showing the other switch in the "off" position, its contact being shown in dotted lines.

The numeral 1 indicates the mast jacket or steering post of the steering mechanism of an automobile.

2 represents the hub of the steering wheel 3 to which latter the hub is connected by means of suitable spokes 4 and 5 in number as may be desired.

Secured to the hub of the steering wheel are two semi-circular grooved collars 6 and 7. These grooved collars are held together by means of two screws 8 and 9, and a strip of insulating material is secured inside the collars to prevent certain of the contacts from touching the steering wheel hub 2, as will be presently explained.

The collars 6 and 7 form a continuous collar around the hub 2 and when joined together they have two complete grooves 10 and 11, the flange between the grooves 10 and 11 being broken away, at one portion, to receive the pivot switch 12.

Resting upon the lower flange below the groove 11 is a metal contact ring 13 against which bears a metal contact 14 carried by an insulating bushing 16 in the enclosed casing 17.

Resting on the flange below the groove 10 is a metal ring 18 against which bears a contact 19 in an insulating bushing 20, just above the insulating bushing 16.

The casing 17 is made up of two parts held together by means of two bolts 21, and secured to the mast jacket in such a position that the circular plate 23, secured on the top of the collars 6 and 7, will project over the edge of the casing and prevent dust and dirt from accumulating therein.

On the opposite side of the casing from the contacts 14 and 19, the casing is provided with a boss 24 which is slotted to receive a contact 25, said contact extends into the lower groove 11 and it has two washers 26 and 27 which cause it to slide up and down without getting out of parallelism with the position it initially occupies. A light spring 28 holds the contact 25 down normally.

On the under-side of the insulating ring there is a continuous metal ring 30 against which a contact 31 bears, the latter contact being held by means of the insulating bushing 32, in the under-side of the split casing 17.

An examination of Fig. 4 will show that the lower contact ring 13 terminates at 13' and 13", and it will also be seen that the contact ring 18 terminates at 18' and 18", the result being that the steering wheel may be rotated through a comparatively small angle, say something less than one-eighth of a turn, without having either of the contact rings touch the contact 25, this amount of movement of the steering wheel being all that is needed for ordinary driving without sharp turns.

The collars 6 and 7 carry two shafts 33 and 34, the former having a switch operating handle 35, and the latter a switch operating handle 36. The shaft 33 has a small cam contact 37 thereon, while the shaft 34 has a small cam contact 38 thereon. These cam contacts are so shaped that they will touch the rings 18 or the rings 13, as may be desired, but regardless of the way the wheel happens to be turned, they will be pushed back into the pockets in which they are normally placed by the contact 25 when they touch it.

It will also be seen in Fig. 6 that the shaft 34 has a washer 40 thereon, which contacts with the ring 30, and the shaft 33 is similarly equipped.

The signal box is connected at 41, and it has openings therethrough, with oppositely pointed arrows, as indicated at 42 and 43 behind which lamps 44 and 45 are insulated.

Wires 46 and 47 extend from the contacts 14 and 19 to the lamps, and other wires 46' and 47' extend from the lamps to the battery "B."

The wire 48 extends from the battery to the contact 25, and another wire 49, extends from the battery to the contact 31.

The operation of the apparatus is as follows:

Assuming the driver to be driving along the ordinary road, he will turn his steering wheel slightly to make the necessary turns, and this amount of movement will allow the ring made up of the two pieces 6 and 7 to move with respect to the contact 25 without illuminating either of the signal lamps.

If the driver is to make a turn, he will turn one of the levers 35 or 36, as he may desire, until its cam contacts touch the ring 13 or the ring 18, as the case may be, thereupon one or the other of the lamps in the signal box will be illuminated, and as he makes the turn, he will rotate the steering wheel until the contact 25 touches either the ring 18 or the ring 13, and as soon as the given cam 37 or 38 touches the contact, the cam will push the contact off the ring supporting it into the pocket where it normally stands, and as soon as the steering wheel is restored to the normal position, the contact 25 will be off the contact ring 13 or 18.

It will be observed in Fig. 4 that if the steering wheel is turned to the right that the ring made up of the two members 6 and 7 will turn clockwise, and the member 25 will travel up on the switch 12 to meet the ring 18.

On the other hand, if a turn to the left is to be made, the split ring will move so that the contact 25 will travel in the lower groove 11 on the ring 13. If the wheel is turned to the right more than one turn, the contact will fall down to its initial position, but, of course, by the time the wheel has been turned one full turn, the automobile will have made a considerable movement along its projected path.

It will also be seen that the cams 37 and 38 are so shaped that whichever way the steering wheel is turned they will be pushed back into their pockets, if they contact with the member 25, this being necessary to prevent injury to the apparatus, due to accidentally leaving the hand switch in the wrong position.

What we claim is as follows, but modifications may be made in carrying out the invention shown in the drawings and in the above particularly described form thereof, within the purview of the invention.

1. An automobile turning signal comprising the combination with a steering gear of an automobile, of an insulated ring surrounding the steering post, metallic contacts arranged in two circuits carried thereby, manual means to connect either circuit with a source of current supply, a secondary contact to continue the connection of either circuit and to reset the manual connections, and a switch to shift the secondary contact from one contact to the other.

2. An automobile turning signal, comprising the combination with the steering gear of an automobile of a grooved insulated ring surrounding the steering post, metallic ring contacts arranged in two circuits carried by said insulated ring, manual means to connect either circuit with a source of current supply, a secondary contact to continue the connection and to reset either of the manual connections, and a pivoted switch to transfer the secondary brush from one of the circuit connections to the other.

3. An automobile turning signal, comprising the combination with the steering gear of an automobile, of an insulated grooved ring surrounding the steering post, a pair of cams carried by said grooved rings, electric circuit connecting rings carried by the grooved rings with which said cams may be connected; manual means for turning either of said cams into contact with the electric circuit rings; a secondary contact to continue either connection and to reset the cams, and a switch to transfer the secondary contact from one of the electric circuit rings to the other.

In testimony whereof we have hereunto set our hands this 25th day of April, A. D. 1923.

ANDREW J. CRUSE.
WALTER L. HANSCOM.
BERT BECKERLEG.